United States Patent
Kagaya

(10) Patent No.: US 7,659,924 B2
(45) Date of Patent: Feb. 9, 2010

(54) IMAGE PROCESSING APPARATUS, METHOD, AND PROGRAM FOR PERFORMING REGULAR IMAGE PROCESSING AND/OR CORRECTION PROCESSING BASED ON A SET PHOTOGRAPHY MODE AND ACTUAL PHOTOGRAPHY INFORMATION

(75) Inventor: Makoto Kagaya, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 815 days.

(21) Appl. No.: 10/917,530

(22) Filed: Aug. 13, 2004

(65) Prior Publication Data

US 2005/0041114 A1    Feb. 24, 2005

(30) Foreign Application Priority Data

Aug. 15, 2003 (JP) ............................. 2003-293791
Jul. 9, 2004 (JP) ............................. 2004-202616

(51) Int. Cl.
H04N 5/228 (2006.01)
(52) U.S. Cl. .................................................. 348/222.1
(58) Field of Classification Search ........................ None
See application file for complete search history.

(56) References Cited

U.S. PATENT DOCUMENTS 6,011,547 A    1/2000  Shiota et al.
7,301,566 B2 *  11/2007 Nakami et al. ........... 348/222.1
7,471,312 B2 *  12/2008 Toyoda .................... 348/207.2
2003/0108337 A1 *  6/2003 Tsuchida et al. .............. 386/95
2003/0197879 A1   10/2003 Terashita
2005/0036035 A1 *  2/2005 Takemoto .............. 348/207.99
2005/0046724 A1 *  3/2005 Kagaya ................. 348/333.01

* cited by examiner

Primary Examiner—Justin P Misleh
(74) Attorney, Agent, or Firm—Sughrue Mion, PLLC

(57) ABSTRACT

Image data on which image processing has already been performed is obtained with a digital camera. Image processing information includes information indicating a photography mode set at the digital camera. Tag information including the image processing information is attached to the image data. If the image processing information includes information indicating a night view mode, an image output device judges whether the night view mode was intentionally set by a user by judging whether photography date/time information included in the tag information represents night. If the judgment is YES, the image output device sets an output image processing means not to perform exposure correction processing. If the judgment is NO, the image output device sets the output image processing means to perform regular processing including the exposure correction processing.

19 Claims, 10 Drawing Sheets

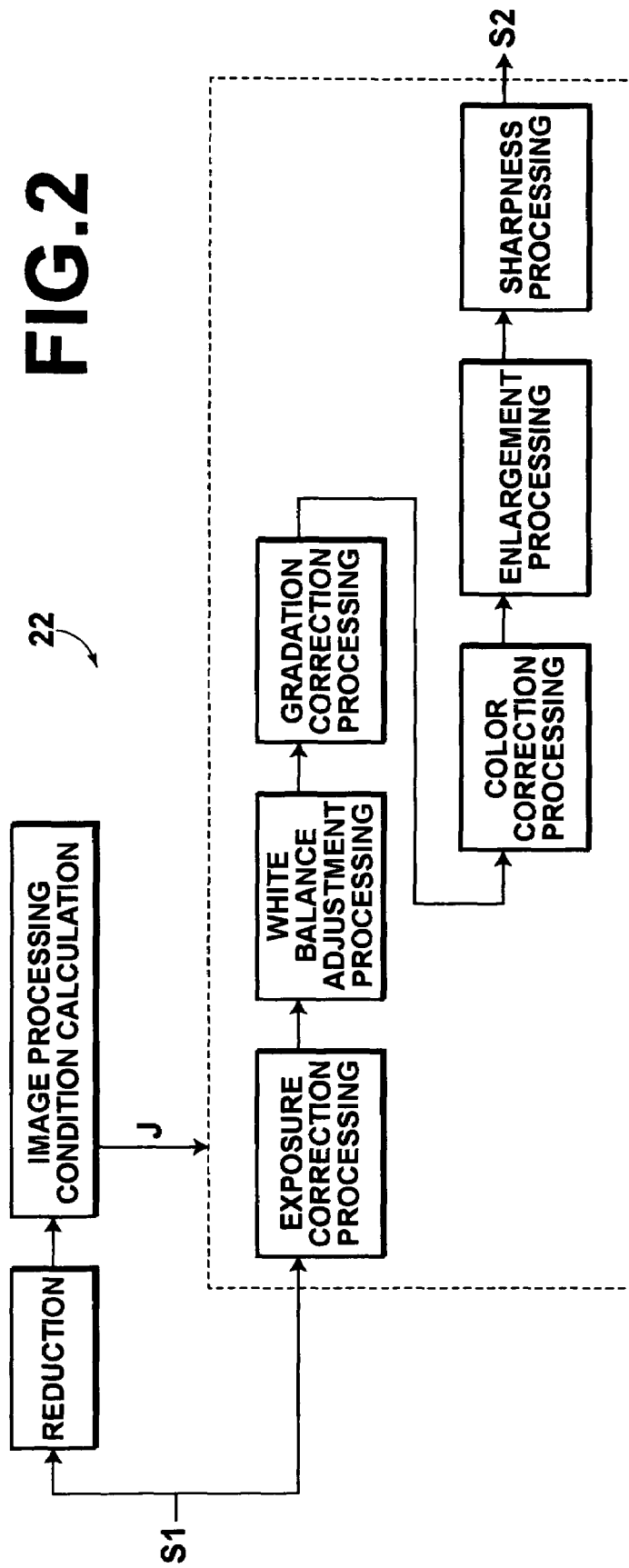

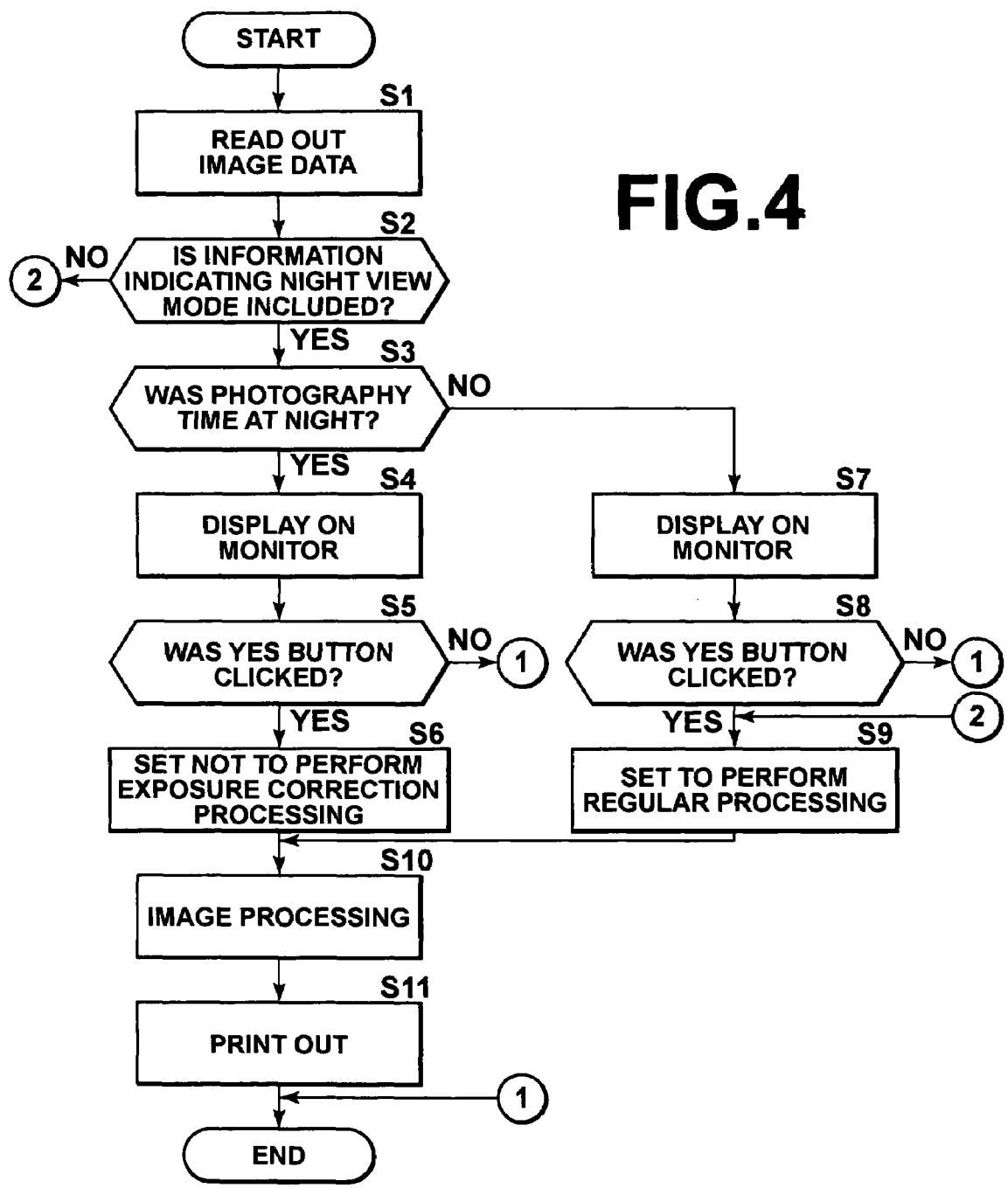

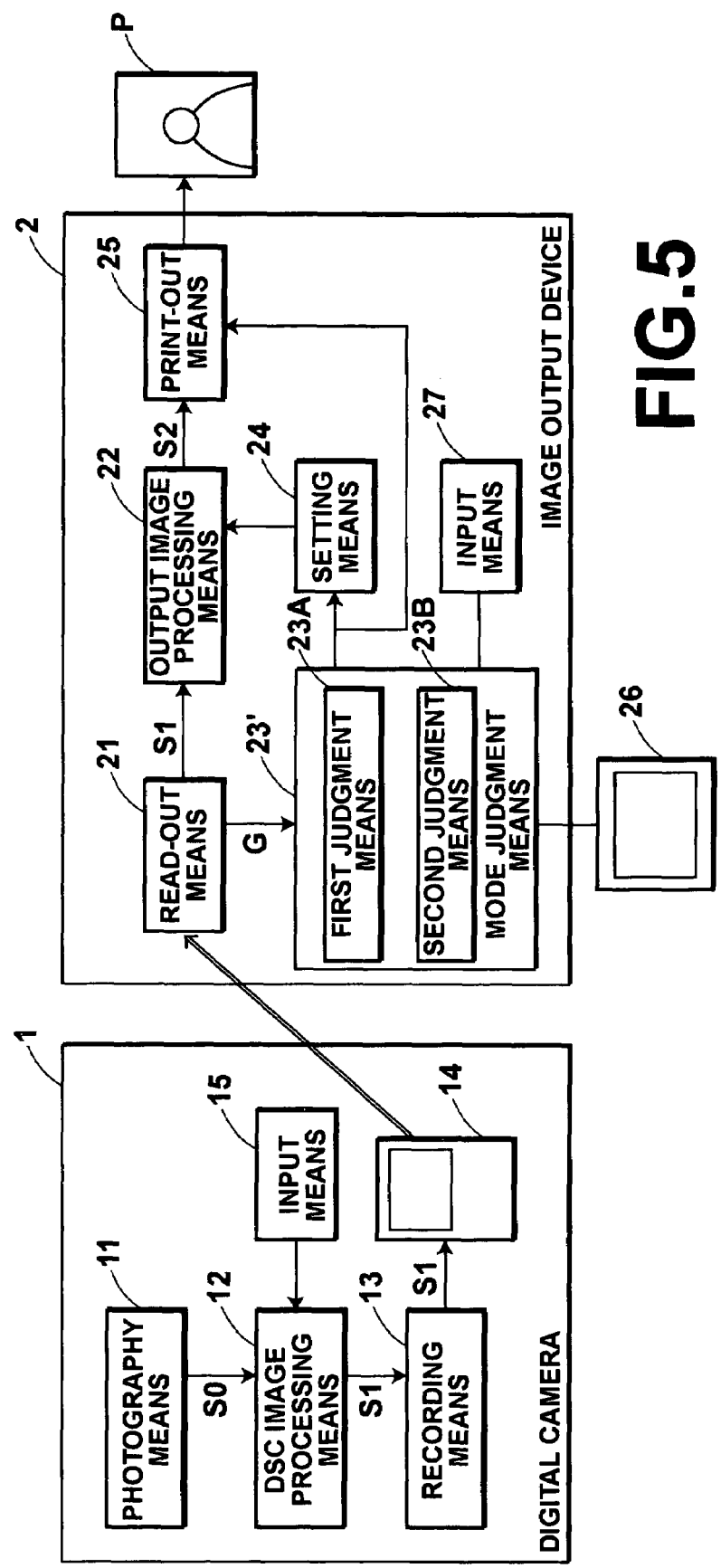

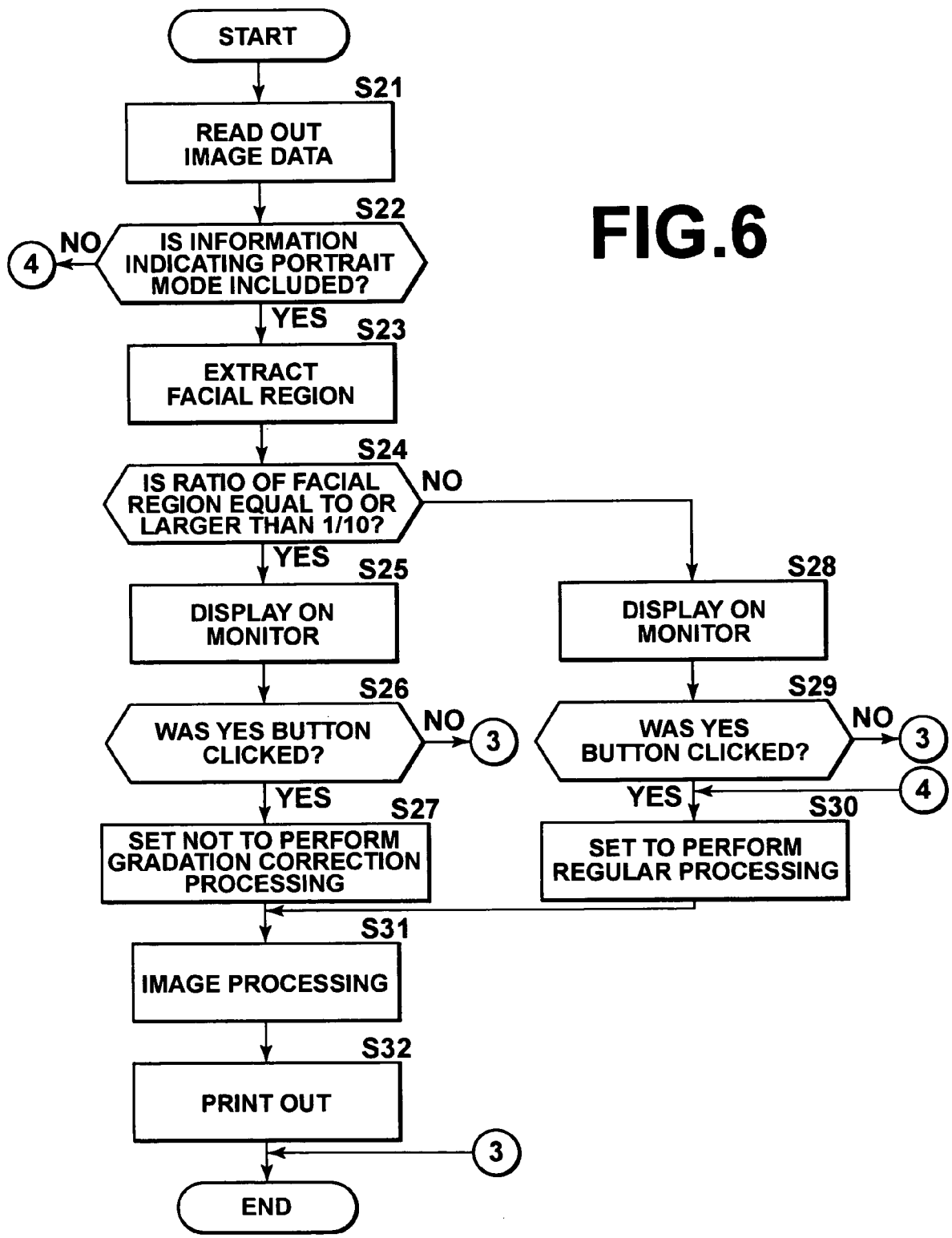

IMAGE PROCESSING APPARATUS, METHOD, AND PROGRAM FOR PERFORMING REGULAR IMAGE PROCESSING AND/OR CORRECTION PROCESSING BASED ON A SET PHOTOGRAPHY MODE AND ACTUAL PHOTOGRAPHY INFORMATION

BACKGROUND OF THE INVENTION

1. Field of the Invention

The present invention relates to an image processing apparatus and an image processing method for performing further image processing on image data which was obtained with a photography device such as a digital camera, which has a function of performing image processing on image data. The further image processing is performed on the image data on which image processing has already been performed, and to which image processing information regarding the performed image processing has been attached. The present invention also relates to a program for causing a computer to execute the image processing method.

2. Description of the Related Art

In digital cameras, images obtained by photography may be recorded as digital image data in recording media such as internal memories of the digital cameras, and IC cards. The images obtained by photography may be reproduced on printers or monitors based on the recorded digital image data. When the images obtained with the digital cameras are reproduced, there are expectations that the images have high quality similar to that of prints reproduced from negative films.

When prints are obtained from the digital image data as described above, image quality of the prints may be improved by performing various kinds of image processing on the image data as required, such as exposure correction processing, white balance adjustment processing, gradation correction processing, color correction processing, and sharpness processing. A method for obtaining prints of higher image quality has been proposed, wherein image data which was obtained with digital cameras and to which photography information such as with/without flash and a type of lighting has been attached is output, and wherein when image processing is performed, the image processing is performed on the image data in a more appropriate manner with reference to the photography information attached to the image data (U.S. Pat. No. 6,011,547).

Meanwhile, digital cameras have also been proposed, which can output processed image data by automatically or manually performing image processing on image data obtained by photography. In such digital cameras having an image processing function, image processing is performed on the image data so that optimum image quality is attained according to photographed scenes and photography conditions. Further, photographers may intentionally select kinds of image processing which will be performed on the image data and various functions related to image processing. The kind of image processing may be selected from automatic white balance adjustment processing, white balance adjustment processing in a fixed light source type mode, image quality modification processing (gradation, sharpness and saturation), taste in reproduction images (monochrome, sepia, beautiful skin or the like) and the like. Further, the various functions related to image processing, such as a photography mode (a portrait mode, a scenery/distant view mode, a macro/close-up mode, a night view/fireworks mode, an underwater photography mode, a user exposure correction mode or the like), an automatic bracket function, photography using an optical filter, soft-focus photography, interval photography, continuous shooting, multiple exposure, synthesis with a template and synthesis with a frame may be selected. Accordingly, optimum image processing may be performed according to the kinds of image processing and functions selected by the photographers to reflect photographers' intentions.

When image data obtained with digital cameras having the image processing functions as described above is reproduced on printers or monitors, further image processing is performed on the image data. However, if the further image processing is performed on the image data on which image processing has already been performed, reproduced images might not have the image quality intended at the digital cameras or reproduction devices. Therefore, a method has been proposed, wherein image processing related to image processing information, which has already been performed on the image data is cancelled or a processing amount of the image processing is reduced based on the image processing information such as a photography mode, attached to the image data (U.S. patent Laid-Open No. 20030197879). In this method, image processing which has already been performed on the image data is not performed or a processing amount of the image processing is reduced. Therefore, processed image data on which image processing has been performed in an appropriate manner may be obtained.

However, if a user of a digital camera erroneously set a photography mode, although image processing which was not intended by the user has been performed on the image data, the image processing which was not intended by the user is cancelled or the processing amount of the image processing is reduced. Therefore, processed image data on which image processing has been performed in an appropriate manner may not be obtained and an image having the image quality intended by the user may not be reproduced.

SUMMARY OF THE INVENTION

In view of the foregoing circumstances, it is a first object of the present invention to make it possible to check whether a photography mode was erroneously set at the time of photography.

It is a second object of the present invention to perform image processing on image data in an appropriate manner, which was obtained with a digital camera which has an image processing function, and on which image processing has already been performed, even if a user erroneously set a photography mode during photography.

An image processing apparatus according to the present invention is an image processing apparatus comprising: a read-out means for reading out image data on which image processing has been performed, and to which supplementary information including image processing information regarding the image processing has been attached; and an intention judgment means for judging whether the image processing has been intentionally performed, based on the image processing information and information other than the image processing information, included in the supplementary information.

The term "image processing information regarding image processing" refers to information indicating the content of image processing which has been performed on the image data or information from which the content of image processing which has been performed on the image data may be inferred. The information indicating the content of image processing is information indicating kinds of image processing, which has been performed on the image data as required, such as automatic white balance adjustment processing, white balance adjustment processing according to light source types, gradation correction processing, density correction processing, color correction processing, sharpness processing, monochrome processing and sepia processing. The information from which the content of image processing may be inferred is information from which the kinds of image processing performed on the image data may not be directly known but the content of the image processing performed on the image data may be inferred. The information from which the content of image processing may be inferred is information such as a photography mode (a portrait mode, a scenery/distant view mode, a macro/close-up mode, a night view/fireworks mode, an underwater photography mode, a user exposure correction mode or the like), an automatic bracket function, photography using an optical filter, soft-focus photography, interval photography, continuous shooting, multiple exposure, synthesis with a template and synthesis with a frame set at the digital camera.

Here, an image data format is defined by Exif (Exchangeable image file format) of JEIDA (Japan Electronic Industry Development Association). Various kinds of information may be included in an Exif format file as tag information of the file. Therefore, supplementary information may be attached to the image data by storing the supplementary information as the tag information.

The term "judging whether image processing has been intentionally performed" refers to making judgment on whether image processing according to kinds of image processing, a photography mode and the like intended by a user who obtained the image data by photography or the like has been performed because the user intentionally set the kinds of image processing, the photography mode and the like.

Here, the image processing apparatus according to the present invention may be configured by integrating a plurality of apparatuses into a system, for instance, by connecting a digital camera and a printer by a cable, instead of being configured by a single apparatus.

The image processing apparatus according to the present invention may further include a display means for displaying the judgment result by the intention judgment means.

The image processing apparatus according to the present invention may further include a processing means for obtaining processed image data by performing at least one kind of further image processing on the image data and a control means for controlling the processing means so that the processing means performs the further image processing on the image data by canceling or reducing a processing amount of the image processing which has already been performed on the image data in the further image processing if the judgment by the intention judgment means is YES, or so that the processing means performs the further image processing on the image data, including the image processing which has already been performed on the image data if the judgment by the intention judgment means is NO.

The term "image processing which has already been performed" refers to specific image processing which has already been performed on image data when a plurality of kinds of further image processing is performed on the image data in the case that the further image processing is to be performed. The image processing which has already been performed may be all of the plurality of kinds of image processing. When only one kind of further image processing is performed on image data, if the further image processing is the same as image processing which has already been performed on the image data, the further image processing is the image processing which has already been performed.

The term "canceling image processing which has been already performed" refers to not performing image processing which has already been performed.

Further, the image processing apparatus according to the present invention may include a display means for displaying a judgment result by the intention judgment means and an input means for receiving an instruction to continue processing, input by an operator based on the judgment result. The control means may also function as a means for controlling the processing means so that the processing means performs the further image processing on the image data based on the judgment result only if the instruction to continue processing has been input from the input means.

The image processing apparatus according to the present invention may further include a print-out means for printing out the processed image data and a print control means for controlling the print-out means so that information indicating the judgment result by the intention judgment means and/or the content of the further image processing which has been performed is attached to a print of the processed image data by printing the information on the back of the print, printing the information on the front of the print in a less noticeable manner, or the like.

In the image processing apparatus according to the present invention, the image processing information may also be information indicating a night view mode set at a photography device with which the image data was obtained and the image processing which has already been performed may also be exposure correction processing.

The image processing apparatus according to the present invention may further include a characteristic judgment means for judging whether an image represented by the image data has a characteristic which should appear in the image according to the image processing information included in the supplementary information attached to the image data when a plurality of kinds of image processing has been performed on the image data. The control means may also function as a means for controlling the processing means so that the processing means performs the further image processing on the image data by canceling or reducing a processing amount of the image processing which has already been performed on the image data in the further image processing if the judgment by the characteristic judgment means is YES, or the processing means performs the further image processing on the image data, including image processing which has already been performed on the image data if the judgment by the characteristic judgment means is NO.

In this case, the image processing information may also be information indicating a portrait mode set at the photography device with which the image data was obtained and the image processing which has already been performed may also be gradation correction processing.

The term "characteristic which should appear in the image according to image processing information" refers to a characteristic which appears in the image, such as color, gradation, density, sharpness, a kind of a specific subject included in the image, such as a face, and a ratio of the specific subject to the entire image. The characteristic represents factors in performing image processing regarding the image processing information. Specifically, when a photograph was taken with a digital camera by setting a portrait mode, image data on which gradation correction processing has been performed may be obtained. In this case, a person's facial region is equal to or larger than $\frac{1}{10}$ of an entire area of the image represented by the image data. The "characteristic which should appear in the image according to a kind of image processing information" is the ratio of the facial region to the entire area of the image. The characteristic judgment means judges whether the image has the characteristic which should appear in the image according to the image processing information attached to the image data by judging whether the ratio is equal to or larger than 1/10, for example.

A first image processing method according to the present invention is an image processing method comprising the steps of:

reading out image data on which image processing has been performed, and to which supplementary information including image processing information regarding the image processing has been attached; and judging whether the image processing has been intentionally performed, based on the image processing information and information other than the image processing information, included in the supplementary information.

A second image processing method according to the present invention is an image processing method comprising the steps of:

obtaining processed image data by performing at least one kind of further image processing on image data on which image processing has been performed and to which supplementary information including image processing information regarding the image processing has been attached;

judging whether the image processing has been intentionally performed, based on the image processing information and information other than the image processing information, included in the supplementary information; and performing the further image processing on the image data by canceling or reducing a processing amount of the image processing which has already been performed on the image data in the further image processing if the judgment is YES or performing the further image processing on the image data, including image processing which has already been performed if the judgment is NO.

A program for causing a computer to execute the first and second image processing methods according to the present invention may also be provided.

According to the present invention, judgment is made on whether image processing has been intentionally performed, based on image processing information attached to image data and information other than the image processing information, included in the supplementary information of the image data. Therefore, a user can check whether the photography mode was erroneously set at the time of photography with reference to the judgment result.

Especially, by displaying the judgment result, the user can easily check whether the photography mode was erroneously set at the time of photography.

Further, according to the present invention, if the judgment on whether the image processing has been intentionally performed is YES, further image processing is performed on the image data by canceling or reducing a processing amount of the image processing which has already been performed on the image data. On the contrary, if the judgment is NO, further image processing including image processing which has already been performed is performed on the image data. Therefore, even if a user erroneously set a photography mode or the like during obtainment of image data with a photography device such as a digital camera, image processing may be performed on the image data in an appropriate manner, on which image processing has already been performed.

Further, a judgment result by the intention judgment means may be displayed and the further image processing may be performed on the image data according to the judgment result only if an instruction to continue processing is input by an operator. Accordingly, the further image processing may be performed on the image data to reflect the intention of the operator.

Further, when processed image data is printed out, if information indicating the judgment result by the intention judgment means and the content of the further image processing performed on the image data are attached to a print, a user who receives the print may know the judgment made on the print and the content of the further image processing performed on the image data.

Here, if a night view mode was set at a photography device, image data on which exposure correction processing has been performed is obtained. The image processing information is information indicating the night view mode and that the image processing, which has already been performed, is exposure correction processing. Therefore, even if a user erroneously set the night view mode at the photography device, exposure correction processing is performed on the image data. Hence, it is possible to prevent the processed image represented by processed image data from becoming a dark image.

Further, when a plurality of kinds of image processing has been performed on the image data, judgment is made on whether an image represented by the image data has a characteristic which should appear in the image according to image processing information included in the supplementary information attached to the image data. If the judgment is YES, further image processing is performed on the image data by canceling or reducing a processing amount of the image processing which has already been performed on the image data. If the judgment is NO, further image processing is performed on the image data, including image processing which has already been performed on the image data. Therefore, even if a user erroneously set a photography mode or the like during obtainment of image data with a photography device such as a digital camera, image processing may be performed on the image data in an appropriate manner, on which image processing has already been performed.

Here, if a portrait mode was set at the photography device, image data on which gradation correction processing has been performed is obtained. The image processing information indicates the portrait mode and that the image processing, which has already been performed, is gradation correction processing. Therefore, even if the portrait mode was erroneously set, gradation correction processing is performed on the image data. Hence, it is possible to prevent the processed image from becoming an image without gradation.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, and magnetic tapes. The invention may also be recorded as computer readable codes on similar computer readable media. Additionally, computer instructions include, but are not limited to: source, object and executable code, and can be in any language including higher level languages, assembly language, and machine language.

BRIEF DESCRIPTION OF THE DRAWINGS

FIG. 2 shows a schematic block diagram illustrating processing performed by an output image processing means;

FIG. 4 shows a flow chart illustrating operation of an image output device in the first embodiment;

FIG. 5 shows a schematic block diagram illustrating the configuration of an image output system to which an image processing apparatus according to a second embodiment of the present invention has been applied;

FIG. 6 shows a flow chart illustrating operation of the image output device in the second embodiment;

DESCRIPTION OF THE PREFERRED EMBODIMENTS

Figure 1:
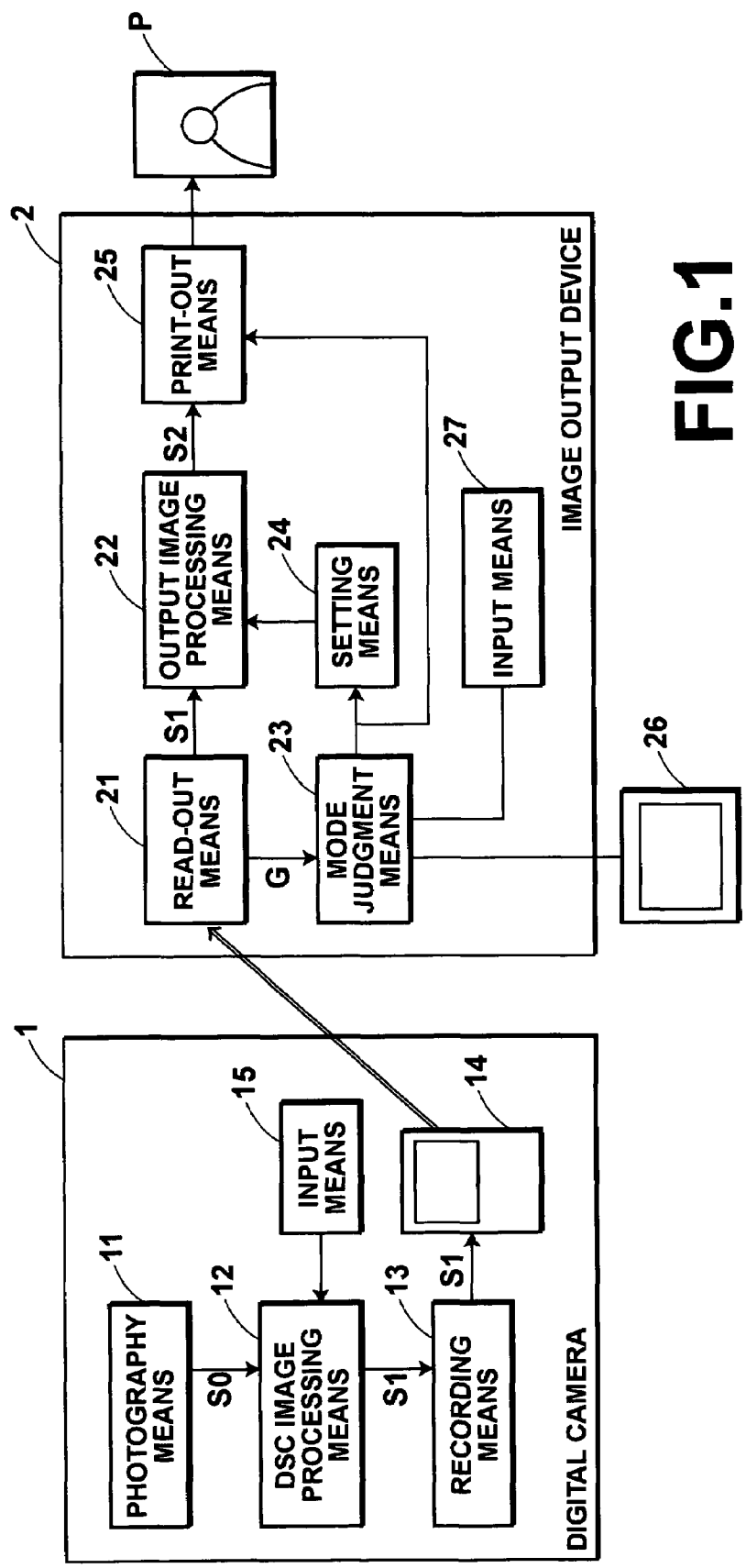
FIG. 1 shows a schematic block diagram illustrating the configuration of an image output system to which an image processing apparatus according to a first embodiment of the present invention has been applied.

Hereinafter, embodiments of the present invention will be described with reference to the attached drawings. FIG. 1 shows a schematic block diagram illustrating the configuration of an image output system to which an image processing apparatus according to a first embodiment of the present invention has been applied. As illustrated in FIG. 1, the image output system according to the first embodiment includes a digital camera 1 and an image output device 2. Image data S1 is obtained with the digital camera 1 and output as a print P from the image output device 2.

The digital camera 1 includes a photography means 11 having a lens, a shutter, a CCD and the like, a DSC image processing means 12 for obtaining image data S1 to be output, by performing image processing on image data S0 obtained with the photography means 11, a recording means 13 for recording the image data S1 in a memory card 14 and an input means 15 such as a select dial and a setting button, for setting various settings on the DSC image processing means 12.

A user who is a photographer may set a kind of image processing with the input means 15, which will be performed on the image data S0 obtained by photography. As examples of image processing, there are automatic white balance adjustment processing, white balance adjustment processing according to a light source type, gradation correction processing, density correction processing, color correction processing, sharpness processing, monochrome processing, sepia processing and the like. Further, a plurality of kinds of image processing according to a photography mode may be performed on the image data S0 by setting the photography mode such as a portrait mode, a scenery/distant view mode, a macro/close-up mode, a night view/fireworks mode, an underwater photography mode, and a user exposure correction mode. Here, the user exposure correction mode is a mode wherein a user manually corrects exposure conditions. An automatic bracket function, photography using an optical filter, soft-focus photography, interval photography, continuous shooting, multiple exposure, synthesis with a template, synthesis with a frame or the like may also be set.

The DSC image processing means 12 obtains the image data S1 to be output, by performing image processing on the image data S0 according to the kind of image processing set by the user who is the photographer. When a photography mode has been set, the DSC image processing means 12 performs the image processing on the image data S0 according to the set photography mode and obtains the image data S1 to be output. For example, if a night view mode has been set, exposure correction processing is performed on the image data S0 and the image data S1 to be output is obtained. If a portrait mode has been set, gradation correction processing is performed on the image data S0 and the image data S1 to be output is obtained.

The image data S1 to be output is image data in the Exif format. Image processing information indicating the kind of image processing which has been performed on the image data S1, the photography mode and the like is included in tag information G of the image data S1 to be output. Further, the tag information G includes photography date/time information indicating data/time of photography of the image data S1.

The recording means 13 records the image data S1, to which the tag information G has been attached, in the memory card 14.

In the digital camera 1 as described above, the photography means 11 obtains the image data S0 and the DSC image processing means 12 performs image processing on the image data S0 to obtain the image data S1 to be output based on the kind of image processing and a photography mode input from the input means 15. Further, the kind of image processing and the photography mode as the image processing information are included in the tag information G of the image data S1 to be output. The recording means 13 records the image data S1 in the memory card 14.

The image output device 2 includes a read-out means 21 such as a card slot, for reading out the image data S1 from the memory card 14, an output image processing means 22 for obtaining processed image data S2 by performing image processing on the image data S, a mode judgment means 23 for judging whether the photography mode during obtainment of the image data S1 was intentionally set by a user of the digital camera 1, a setting means 24 for setting processing content of image processing which will be performed on the image data S1 by the output image processing means 22 based on the judgment result of the mode judgment means 23, a print-out means 25 for printing out the processed image data S2, a monitor 26 for displaying various kinds of information and an input means 27 such as a keyboard and a mouse, for receiving various data input by an operator.

FIG. 2 shows a schematic block diagram illustrating processing performed by the output image processing means 22. As illustrated in FIG. 2, the output image processing means 22 reduces the image data S1 and calculates an image processing condition J based on the reduced image data S1. The output image processing means 22 performs at least one of exposure correction processing, white balance adjustment processing, gradation correction processing, color correction processing, enlargement processing for adjusting a size and sharpness processing on the image data S1 as required, based on the calculated image processing condition J and obtains the processed image data S2. The processing content of the image processing which will be performed by the output image processing means 22 is set by the setting means 24.

The mode judgment means 23 judges whether the image processing information included in the tag information G of the image data S1 includes information indicating a night view mode because the user set the night view mode as the photography mode at the digital camera 1 (First Judgment). If the information indicating the night view mode is included, the mode judgment means 23 refers to photography date/time information included in the tag information G and judges whether the image data S1 was obtained during the period from 19:00 to 5:00, that is, nighttime (Second Judgment).

Figure 3A:
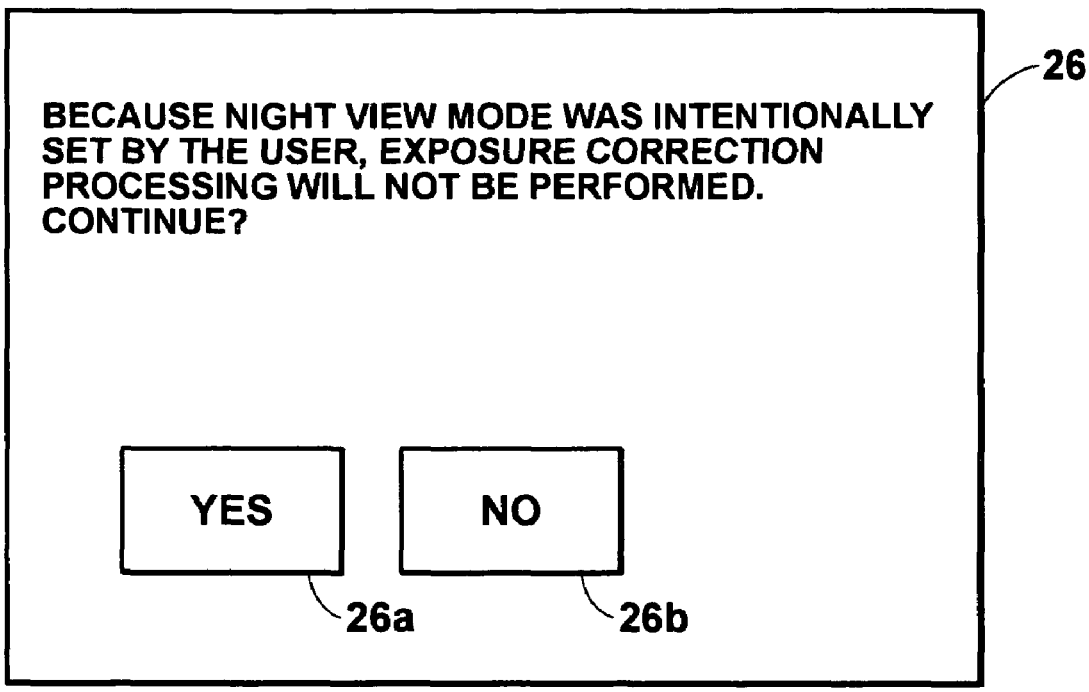
FIG. 3A illustrates the content of display on a monitor.

If the first judgment is NO, the mode judgment means 23 outputs information on the judgment result to the setting means 24. If the first judgment is YES and the second judgment is also YES, the night view mode has been intentionally set by the user of the digital camera 1. Therefore, the mode judgment means 23 displays information on the monitor 26, indicating that exposure correction processing will not be performed. FIG. 3A illustrates the content of display when the first judgment is YES and the second judgment is also YES. As illustrated in FIG. 3A, the monitor 26 displays a message saying "BECAUSE NIGHT VIEW MODE WAS INTENTIONALLY SET BY THE USER, EXPOSURE CORRECTION PROCESSING WILL NOT BE PERFORMED. CONTINUE?", a YES button 26a which should be clicked to continue and a NO button 26b which should be clicked to discontinue. If the YES button 26a is clicked, the mode judgment means 23 outputs the judgment result to the setting means 24. If the NO button 26b is clicked, the mode judgment means 23 instructs the setting means 24 to cease image processing on the image data S1 and instructs the print-out means 25 to cease printing out, respectively.

Figure 3B:
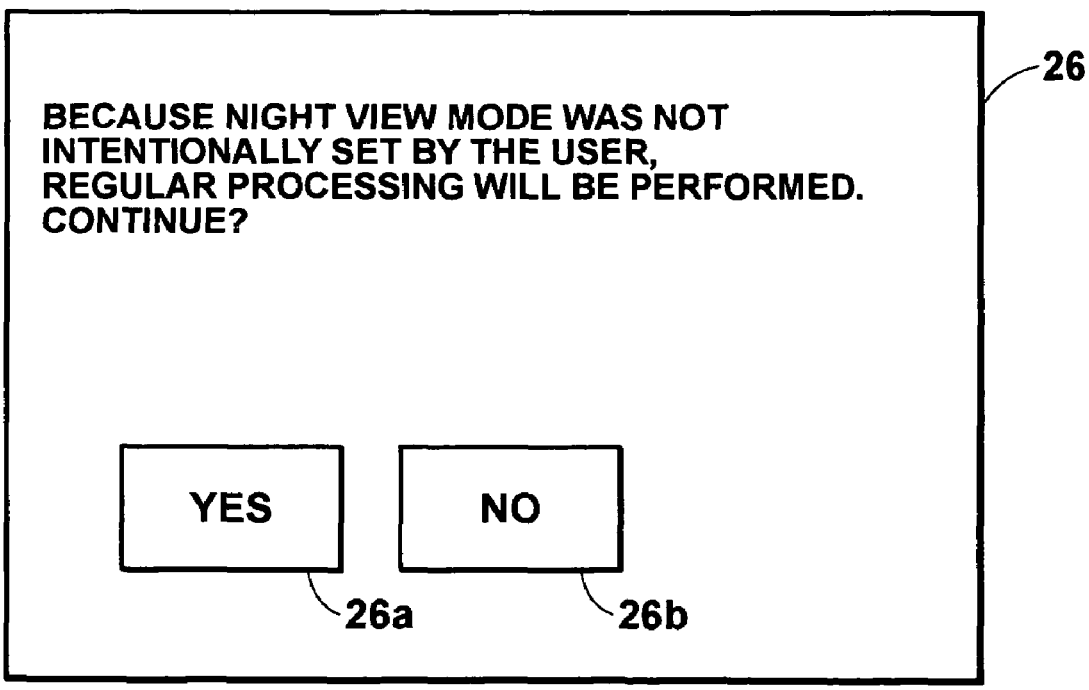
FIG. 3B illustrates the content of display on a monitor.

On the contrary, if the first judgment is YES and the second judging is NO, although the night view mode was set, the night view mode was not intentionally set by the user. Therefore, information indicating that regular processing including exposure correction processing will be performed is displayed on the monitor 26. The regular processing is to perform at least one of exposure correction processing, white balance adjustment processing, gradation correction processing, color correction processing, enlargement processing for adjusting a size and sharpness processing as required. FIG. 3B shows the content of display on the monitor 26 when the first judgment is YES and the second judgment is NO. As illustrated in FIG. 3B, the monitor 26 displays a message saying "BECAUSE NIGHT VIEW MODE WAS NOT INTENTIONALLY SET BY THE USER, REGULAR PROCESSING WILL BE PERFORMED. CONTINUE?", the YES button 26a which should be clicked to continue and the NO button 26b which should be clicked to discontinue. If the YES button 26a is clicked, the mode judgment means 23 outputs the judgment result to the setting means 24. If the NO button 26b is clicked, the mode judgment means 23 instructs the setting means 24 to cease the image processing on the image data S1 and instructs the print-out means 25 to case printing out, respectively.

The setting means 24 sets the content of image processing which will be performed by the output image processing means 22, based on the judgment result output by the mode judgment means 23. Specifically, the setting means 24 sets the output image processing means 22 to perform the regular processing if the first judgment is NO or if the first judgment is YES and the second judgment is NO. If the first judgment is YES and the second judgment is also YES, the setting means 24 sets the output image processing means 22 not to perform exposure correction processing even if the image processing based on the image processing condition J includes the exposure correction processing.

If the mode judgment means 23 has instructed the setting means 24 to cease image processing on the image data S1, the setting means 24 sets the output image processing means 22 to cease the image processing. At this time, it is preferable to display the information on the monitor 26, indicating that image processing has been ceased.

Next, an operation of the image output device 2 according to the first embodiment will be described. FIG. 4 shows a flow chart illustrating the operation of the image output device 2 according to the first embodiment. First, a read-out means 21 reads out the image data S1 from the memory card 14 (step S1) and inputs the tag information G attached to the image data S1 which has been read out to the mode judgment means 23. The mode judgment means 23 judges whether image processing information included in the tag information G includes information indicating the night view mode (step S2). If step S2 is YES, the mode judgment means 23 judges whether the photography time when the image data S1 was obtained was night based on the photography date/time information included in the tag information G (step S3).

If step S3 is YES, the night view mode was intentionally set by the user. Therefore, information indicating that exposure correction processing will not be performed is displayed on the monitor 26, as illustrated in FIG. 3A (step S4). Then, judgment is made on whether the YES buttons 26a has been clicked by the operator (step S5). If step S5 is YES, the judgment result is output to the setting means 24. The setting means 24 sets the output image processing means 22 not to perform exposure correction processing, even if the image processing based on the image processing condition J includes the exposure correction processing (step S6). If step S5 is NO, the mode judgment means 23 instructs the setting means 24 to cease image processing and instructs the print-out means 25 to cease printing out, respectively. The setting means 24 sets the output image processing means 22 to cease image processing. Consequently, the processing on the image data S1 ends.

On the contrary, if step S3 is NO, although the night view mode was set, the night view mode was not intentionally set by the user. Therefore, the mode judgment means 23 displays information on the monitor 26, indicating that regular processing including exposure correction processing will be performed, as illustrated in FIG. 3B (step S7). Then, the mode judgment means 23 judges whether the YES button 26a has been clicked by the operator (step S8). If step S8 is YES, the judgment result is output to the setting means 24. The setting means 24 sets the output image processing means 22 to perform the regular processing (step S9). If step S8 is NO, the mode judgment means 23 instructs the setting means 24 to cease image processing and instructs the print-out means 25 to cease printing out, respectively. The setting means 24 sets the output image processing means 22 to cease image processing. Consequently, processing on the image data S1 ends.

If step S2 is NO, the mode judgment means 23 judges that the night view mode has not been set and outputs the judgment result to the setting means 24. The setting means 24 sets the output image processing means 22 to perform the regular processing (step S9).

After the content of image processing has been set as described above, the output image processing means 22 performs image processing on the image data S1 and obtains processed image data S2 (step S10). The processed image data S2 is output as a print P from the print-out means 25 (step S11) and processing ends.

It is preferable that information indicating the judgment result by the mode judgment means 23 and the content of image processing performed on the image data S1 are printed on the back of the print P or the like. A message saying "BECAUSE NIGHT VIEW MODE WAS INTENTION- ALLY SET BY THE USER, EXPOSURE CORRECTION PROCESSING HAS NOT BEEN PERFORMED." or the like should be printed. At this time, illustrations that can specify the judgment result and the content of image processing may be printed instead of characters.

As described above, in the first embodiment, judgment is made on whether the image processing information in the tag information G attached to the image data includes information indicating the night view mode. If information indicating the night view mode is included, judgment is made on whether the image data S1 was obtained at night based on the photography date/time information in the tag information G. If the image data S1 was not obtained at night, the regular processing including exposure correction processing is performed. If the image data S1 was obtained at night, exposure correction processing is not performed, even if the image processing based on the image processing condition J includes the exposure correction processing. Therefore, even if a user erroneously set a night view mode during photography with the digital camera 1, image processing may be performed on the image data S1 in an appropriate manner and the processed image data S2 may be obtained.

Further, the judgment result by the mode judgment means 23 is displayed on the monitor 26 and the operator selects whether processing should be continued based on the judgment result. Therefore, image processing may be performed on the image data S1 to reflect intention of the operator.

Further, because the information indicating the judgment result by the mode judgment means 23 is printed on the back of the print P, when the user sees the print P, the user may easily know the content of image processing performed on the image data S1 at the digital camera 1 during photography, from which the print P has been obtained.

There are cases where the tag information G attached to the image data S1 does not include the photography date/time information. In such cases, it may be judged that the night view mode was intentionally set by the user, and the mode judgment means 23 may set the output image processing means 22 not to perform exposure correction processing.

Further, in the first embodiment as described above, when the night view mode was set, judgment is made on whether the night view mode was intentionally set by the user, based on the photography date/time information included in the tag information G. However, since various photography modes such as the scenery/distant view mode, the macro mode and the underwater photography mode may be set as described above, judgment may also be made on whether an arbitrary photography mode was intentionally set by the user, based on information other than the image processing information, included in the tag information G.

Next, a second embodiment of the present invention will be described. FIG. 5 shows a schematic block diagram illustrating a configuration of an image output system to which an image processing apparatus according to the second embodiment of the present invention has been applied. In the second embodiment, the same elements as in the first embodiment have the same reference numbers and detailed explanations thereof will be omitted. The second embodiment is different from the first embodiment in that a mode judgment means 23' including a first judgment means 23A and a second judgment means 23B is provided instead of the mode judgment means 23. The first judgment means 23A performs the same processing as the first embodiment as described above. The second judgment means 23B judges whether the image processing information includes information indicating the portrait mode as the photography mode. If the information indicating the portrait mode is included, a facial region is extracted from an image (hereinafter, the reference number S1 is also used for indicating the image), represented by the image data S1. If a ratio of the facial region to an entire area of the image S1 is equal to or larger than a predetermined threshold value Th1 (1/10, for example), it is judged that the portrait mode was intentionally set by the user at the digital camera 1. Then, the setting means 24 sets the output image processing means 22 not to perform gradation correction processing which has been performed at the digital camera 1 when the portrait mode was set, even if the image processing based on the image processing condition J includes the gradation correction processing.

Next, an operation of the image output device 2 according to the second embodiment will be described. FIG. 6 shows a flow chart illustrating the operation of the image output device 2 according to the second embodiment. Because processing of the first judgment means 23A in the second embodiment is the same as processing of the mode judgment means 23 in the first embodiment, only processing by the second judgment means 23B will be explained. First, the read-out means 21 reads the image data S1 from the memory card 14 (step S21) and inputs the tag information G attached to the read-out image data S1 to the second judgment means 23B of the mode judgment means 23'. The second judgment means 23B judges whether the image processing information in the tag information G includes the information indicating the portrait mode (step S22). If step S22 is YES, a person's facial region is extracted from the image S1 (step S23). Then, the second judgment means 23B judges whether the ratio of the extracted facial region to the entire area of the image S1 is equal to or larger than 1/10 (step S24).

As methods for extracting the facial region, methods disclosed in Japanese Unexamined Patent Publication No. 9(1997)-101579 and Japanese Unexamined Patent Publication No. 9(1997)-138470 may be used. In Japanese Unexamined Patent Publication No. 9(1997)-101579, a method is disclosed, wherein a flesh color area and an edge are detected in an image, and wherein the image is further classified into an edge portion and a non-edge portion, and wherein an area made of pixels classified as the non-edge portion positioned in a flesh color area and surrounded with pixels classified as the edge portion is extracted. In Japanese Unexamined Patent Publication No. 9(1997)-138470, a method is disclosed, wherein facial region extraction performance is evaluated in advance by using a multiplicity of sample images, and wherein an estimated facial candidate region corresponding to a person's face is extracted from an image by one of n kinds of mutually different extraction methods each having a predetermined weighting coefficient based on the evaluation result, wherein the extracted facial candidate region is weighted respectively by using the weighting coefficient according to the extraction method, and wherein a region which corresponds to a person's face with high probability is extracted as a facial region based on the weighting result.

If step S24 is YES, the portrait mode was intentionally set by the user. Therefore, information indicating that gradation correction processing will not be performed is displayed on the monitor 26 (step S25). At this time, the monitor 26 displays a message saying "BECAUSE PORTRAIT MODE WAS INTENTIONALLY SET BY THE USER, GRADATION CORRECTION PROCESSING WILL NOT BE PERFORMED. CONTINUE?". Then, judgment is made on whether the YES button 26a has been clicked by the operator (step S26). If step S26 is YES, the judgment result is output to the setting means 24. The setting means 24 sets the output image processing means 22 not to perform gradation correction processing, even if the image processing based on the image processing condition J includes the gradation correction processing (step S27). If step S26 is NO, the second judgment means 23B instructs the setting means 24 to cease image processing and instructs the print-out means 25 to cease printing out, respectively. The setting means 24 sets the output image processing means 22 to cease the image processing. Accordingly, processing on the image data S1 ends.

On the contrary, if step S24 is NO, although the portrait mode was set, the portrait mode was not intentionally set by the user. Therefore, the second judgment means 23B displays information on the monitor 26, indicating that the regular processing including gradation correction processing will be performed (step S28). At this time, the monitor 26 displays a message saying "BECAUSE PORTRAIT MODE WAS NOT INTENTIONALLY SET BY THE USER, REGULAR PROCESSING WILL BE PERFORMED. CONTINUE?". Then, judgment is made on whether the YES button 26a has been clicked by the operator (step S29). If step S29 is YES, the judgment result is output to the setting means 24. The setting means 24 sets the output image processing means 22 to perform the regular processing (step S30). If step S29 is NO, the second judgment means 23B instructs the setting means 24 to cease image processing and instructs the print-out means 25 to cease printing out, respectively. The setting means 24 sets the output image processing means 22 to cease image processing. Accordingly, processing on the image data S1 ends.

If step S22 is NO, the second judgment means 23B judges that the portrait mode has not been set and outputs the judgment result to the setting means 24. The setting means 24 sets the output image processing means 22 to perform the regular processing (step S30).

As described above, after the content of image processing has been set, the output image processing means 22 performs image processing on the image data S1 and obtains the processed image data S2 (step S31). The processed image data S2 is printed out as the print P by the print-out means 25 (step S32) and processing ends.

As described above, in the second embodiment, judgment is made on whether information indicating the portrait mode is included in the image processing information. If the information indicating the portrait mode is included in the image processing information, a facial region is extracted from the image S1 and judgment is made on whether the facial region is equal to or larger than ⅒ of the entire area of the image S1. If the facial region is less than ⅒, the regular processing including gradation correction processing is performed. If the facial region is equal to or larger than ⅒, gradation correction processing is not performed, even if the image processing based on the image processing condition J includes the gradation correction processing. Therefore, even if the user erroneously sets the portrait mode during photography with the digital camera 1, image processing may be performed on the image data S1 in an appropriate manner and the processed image data S2 may be obtained.

Further, in the above-described second embodiment, when the portrait mode was set, judgment is made on whether the portrait mode was intentionally set by the user by judging whether the facial region included in the image S1 is equal to or larger than ⅒ of the entire area of the image S1. However, because various photography modes such as the scenery/distant view mode, the macro mode, and the underwater photography mode may be set at the digital camera 1 as described above, judgment may be made on whether an arbitrary photography mode was intentionally set by the user based on information obtained by analyzing the image data S1, such as color, gradation, density, sharpness, a kind of a specific subject such as a face, included in the image, and a ratio of the specific subject to the entire image. For example, if the underwater photography mode has been set, color information included in the image S1 is analyzed and judgment is made on whether the image is bluish. If the image is bluish, it may be judged that the underwater photography mode was intentionally set by the user. If the image is not bluish, it may be judged that the underwater photography mode was not intentionally set by the user.

Figure 7:
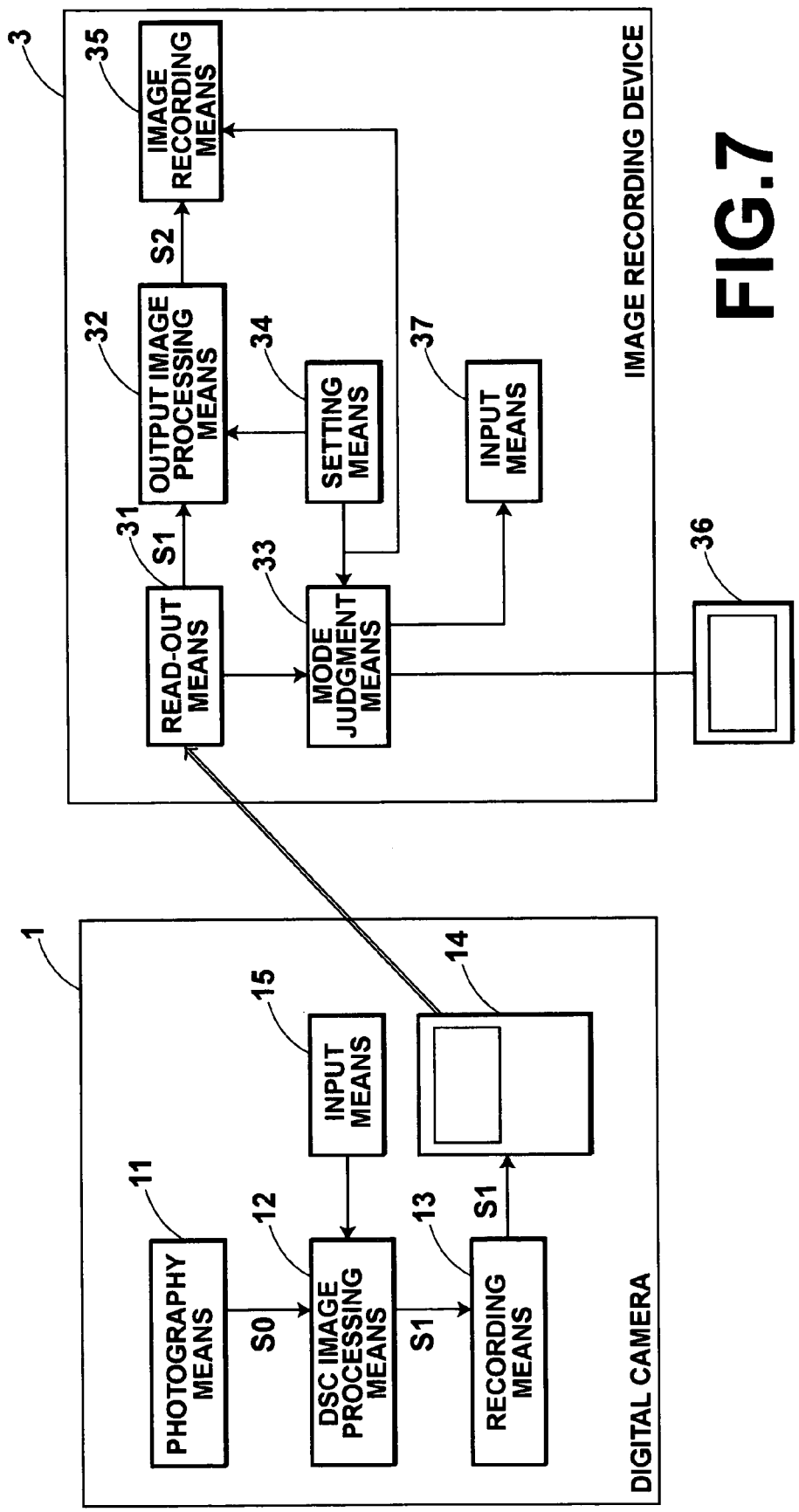
FIG. 7 shows a schematic block diagram illustrating the configuration of an image output system to which an image processing apparatus according to a third embodiment of the present invention has been applied.

Next, a third embodiment of the present invention will be described. FIG. 7 shows a schematic block diagram illustrating the configuration of an image output system to which an image processing apparatus according to the third embodiment of the present invention has been applied. In the third embodiment, the elements analogous to those of the first embodiment are given the same reference numerals and will not be described in detail here. The third embodiment is different from the first embodiment in that an image recording device 3 including a read-out means 31, an output image processing means 32, a mode judgment means 33, a setting means 34, a monitor 36 and an input means 37 corresponding to the read-out means 21, the output image processing means 22, the mode judgment means 23, the setting means 24, the monitor 26 and the input means 27 respectively and an image recording means 35 is provided instead of the image output device 2, and the processed image data S2 is stored in a recording medium by the image recording means 35 instead of being printed out.

An arbitrary means which can electrically, optically or magnetically record the processed image data S2 in a recording medium such as hard disks, CD-R's and memory cards may be used as the image recording means 35.

In the third embodiment, the first judgment and the second judgment are made as in the above-described first embodiment. If the first judgment is YES and the second judgment is also YES, the night view mode has been intentionally set by the user of the digital camera 1. Therefore, the mode judgment means 33 displays information on the monitor 36, indicating that exposure correction processing will not be performed, in the same manner with the display on the monitor 26 as illustrated in FIG. 3A. If the YES button 26a is clicked, the setting means 34 sets the output image processing means 32 not to perform exposure correction processing even if image processing based on the image processing condition J includes the exposure correction processing. In contrast, if the first judgment is YES and the second judgment is NO, although the night view mode was set, the night view mode was not intentionally set by the user. Therefore, the mode judgment means 33 displays information on the monitor 36, indicating that regular processing including the exposure correction processing will be performed, in the same manner with the display on the monitor 26 as illustrated in FIG. 3B. If the YES button 26a is clicked, the setting means 34 sets the output image processing means 32 to perform the regular processing including the exposure correction processing.

Then, the output image processing means 32 performs image processing on the image data S1 and obtains the processed image data S2. The image recording means 35 records the processed image data S2 in the recording medium. If the NO button 26b is clicked in the displays illustrated in FIGS. 3A and 3B, the mode judgment means 33 instructs the setting means 34 to cease image processing and instructs the image recording means 35 to cease recording the image data, respectively.

Figure 8:
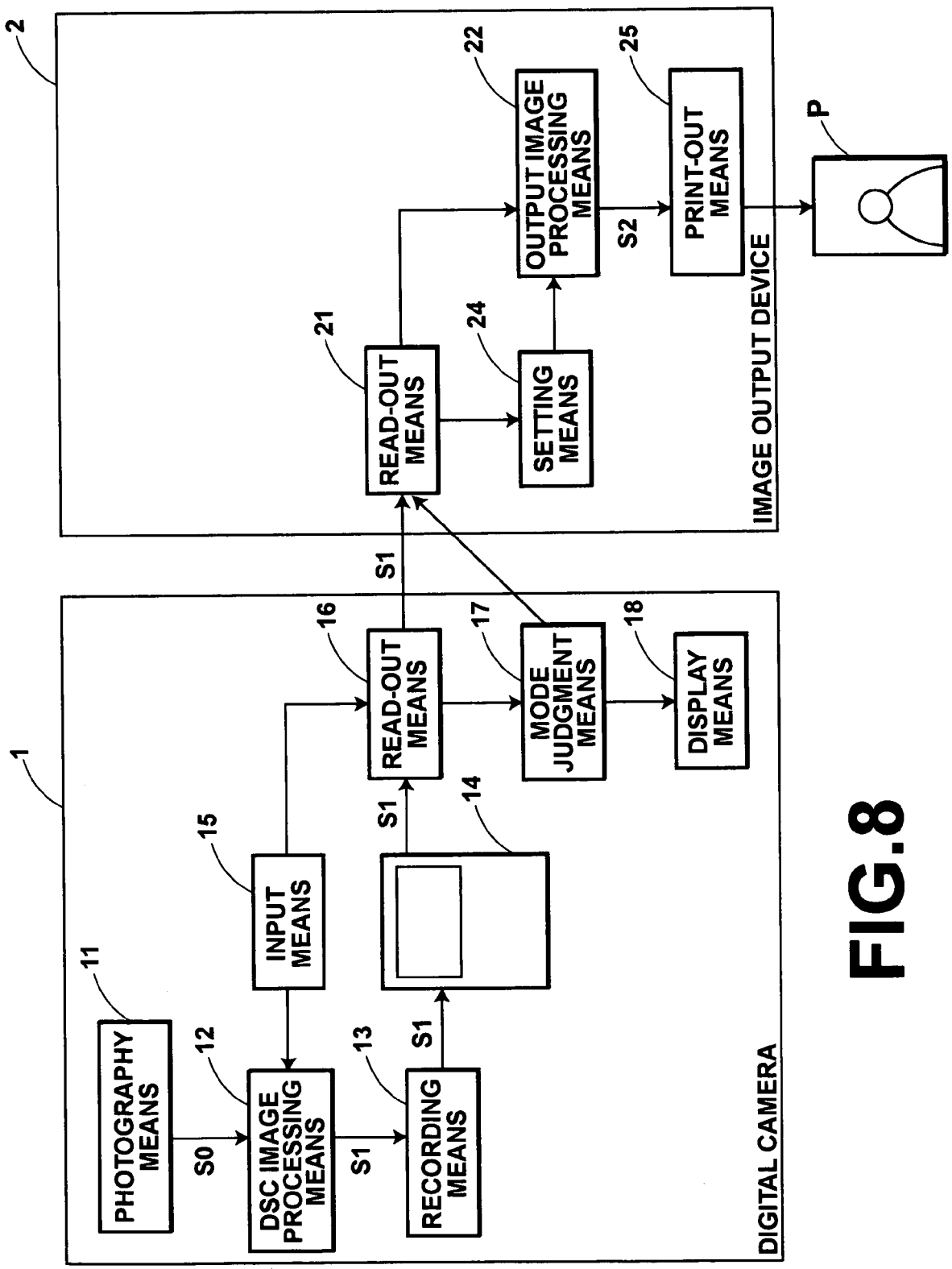
FIG. 8 shows a schematic block diagram illustrating the configuration of an image output system to which an image processing apparatus according to a fourth embodiment of the present invention has been applied.

Next, a fourth embodiment of the present invention will be described. FIG. 8 shows a schematic block diagram illustrating an image output system to which an image processing apparatus according to the fourth embodiment of the present invention has been applied. In the fourth embodiment, the elements analogous to those of the first embodiment are given the same reference numerals and will not be described in detail here. The fourth embodiment is different from the first embodiment in that a read-out means 16 and a mode judgment means 17 corresponding to the read-out means 21 and the mode judgment means 23 respectively are provided in the digital camera 1. The fourth embodiment is also different from the first embodiment in that a display means 18 such as a liquid crystal monitor, for displaying various kinds of information, is provided in the third embodiment. The fourth embodiment is also different from the first embodiment in that the mode judgment means 23, the monitor 26 and the input means 27 are omitted in the image output device 2, and the processed image data S2 is printed out at the image output device 2 by an operation from the digital camera 1 by connecting the digital camera 1 to the image output device 2 by a cable which is not illustrated.

In the fourth embodiment, first, the user operates the input means 15 at the digital camera 1, and the read-out means 16 reads out the image data S1 to be printed out from the memory card 14 and displays the image data S1 on the display means 18 to check the image data S1. At this time, the mode judgment means 17 judges whether information indicating the night view mode is included in image processing information in the tag information G of the image data S1 because the user set the night view mode as the photography mode (First Judgment). Then, if the information indicating the night view mode is included, the mode judgment means 23 refers to photography date/time information included in the tag information G and judges whether the image data S1 was obtained during the period from 19:00 to 5:00, that is, nighttime (Second Judgment).

If the first judgment is NO, the read-out means 16 sends the image data S1 to the image output device 2 and the mode judgment means 17 sends an instruction to perform regular processing to the image output device 2, respectively.

Figure 9A:
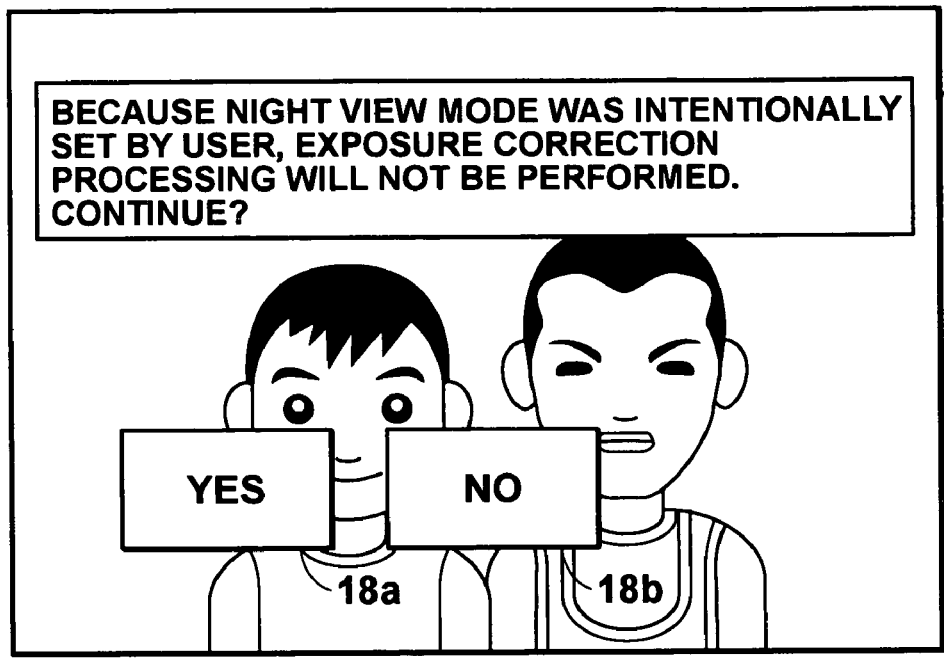
FIG. 9A illustrates the content of display by a display means in the fourth embodiment.

If the first judgment is YES and the second judgment is also YES, the night view mode has been intentionally set by the user of the digital camera 1. Therefore, the mode judgment means 17 displays information indicating that exposure correction processing will not be performed on the display means 18 together with an image represented by the image data S1, as illustrated in FIG. 9A. Then, if the YES button 18a is clicked, the read-out means 16 sends the image data S1 to the image output device 2 and the mode judgment means 17 sends an instruction not to perform exposure correction processing to the image output device 2, respectively. If the NO button 18b is clicked, processing ends without sending any instruction from the digital camera 1 to the image output device 2.

Figure 9B:
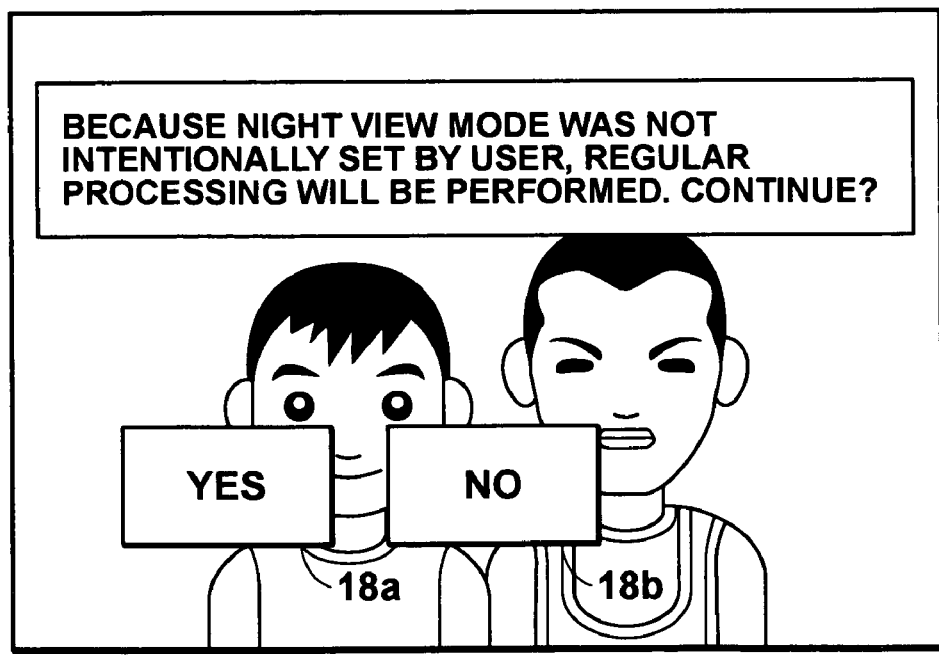
FIG. 9B illustrates the content of display by a display means in the fourth embodiment.

In contrast, if the first judgment is YES and the second judgment is No, although the night view mode has been set, the night view mode has not been intentionally set by the user. Therefore, the mode judgment means 17 displays information indicating that regular processing including exposure correction processing will be performed on the display means 18 together with an image represented by the image data S1, as illustrated in FIG. 9B. Then, if the YES button 18a is clicked, the read-out means 16 sends the image data S1 to the image output device 2 and the mode judgment means 17 sends an instruction to perform the regular processing to the image output device 2, respectively. If the NO button 18b is clicked, processing ends without sending any instruction from the digital camera 1 to the image output device 2.

In the image output device 2, the read-out means 21 receives the image data S1 and the instruction from the mode judgment means 17. Then, the setting means 24 sets the content of image processing performed by the output image processing means 22 according to the content of instruction sent by the mode judgment means 17. Specifically, if the first judgment is NO, or if the first judgment is YES and the second judgment is NO, the regular processing is performed. If the first judgment is YES and the second judgment is also YES, the setting means 24 sets the output image processing means 22 not to perform the exposure correction processing even if image processing based on the image processing condition J includes the exposure correction processing.

The output image processing means 22 obtains the processed image data S2 by performing image processing on the image data S1 according to the content of processing set by the setting means 24. Then, the print-out means 25 prints out the image data S2, and processing ends.

In the above-described third and fourth embodiments, the judgment may be further made on whether the user has intentionally set the portrait mode, in the same manner with the above-described second embodiment, by judging whether the ratio of the facial region included in the image S1 is equal to or larger than $\frac{1}{10}$ of the entire area of the image S1 when the portrait mode has been set.

In the above-described first to fourth embodiments, the content of processing which will be performed on the image data S1 is displayed on the monitors 26, 36 or the display means 18 to cause the operator or user to give an instruction either to continue or not to continue. However, image processing may also be directly performed on the image data S1 based on the judgment result by the mode judgment means 23, 23' and 17 without prompting the operator or the user for instructions.

In the above-described first to fourth embodiments, if it is judged that the night view mode or the portrait mode was intentionally set by the user, exposure correction processing or gradation correction processing is not performed. However, the exposure correction processing or the gradation correction processing may be performed by reducing a processing amount.

Figure 10:
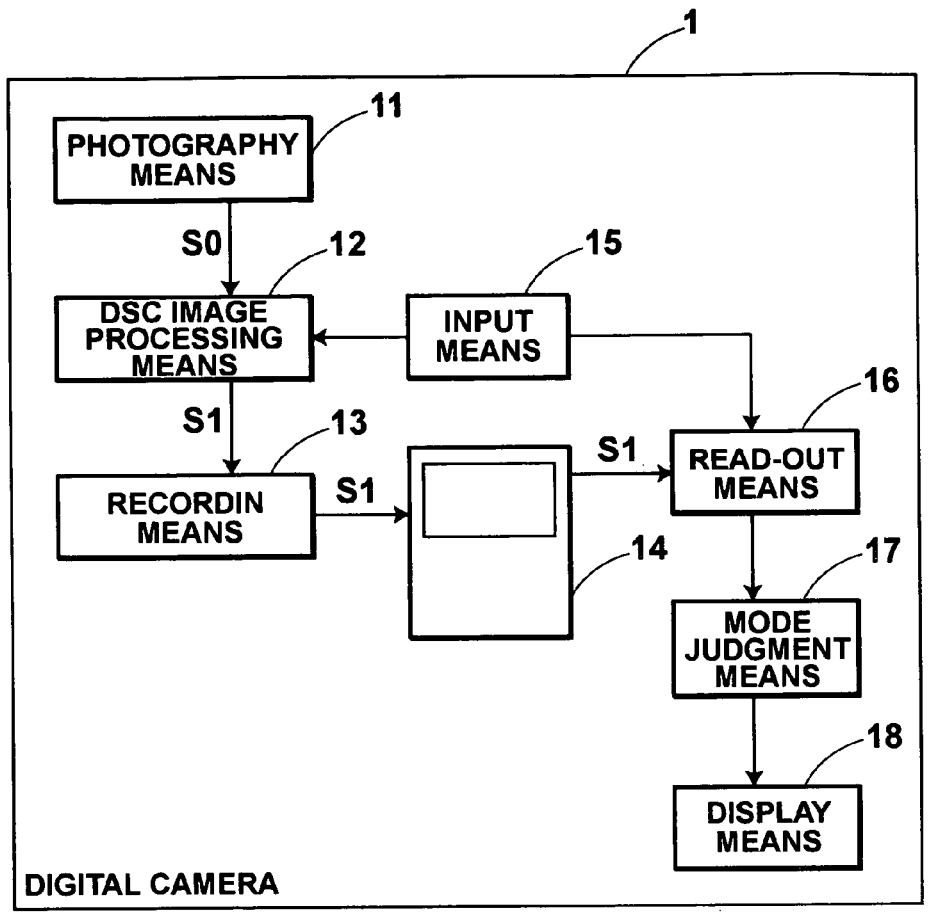
FIG. 10 shows a schematic block diagram illustrating the configuration of a digital came to which an image processing apparatus according to a fifth embodiment of the present invention has been applied.

Next, a fifth embodiment of the present invention will be described. FIG. 10 shows a schematic block diagram illustrating a digital camera to which an image processing apparatus according to the fifth embodiment of the present invention has been applied. In the fifth embodiment, the elements analogous to those of the first embodiment are given the same reference numerals and will not be described in detail here. The fifth embodiment is different from the first embodiment in that the read-out means 16 and the mode judgment means 17 corresponding to the read-out means 21 and the mode judgment means 23 respectively are provided in the digital camera 1 and the display means 18 such as a liquid crystal monitor, for displaying various kinds of information, is provided.

In the fifth embodiment, when the read-out means 16 reads out the image data S1 recorded in the memory card 14 and displays the image data S1 on the display means 18 so that the user can check the image obtained by photographing, the mode judgment means 17 makes the first judgment. If the first judgment is YES, the mode judgment means 17 makes the second judgment.

If the first judgment is YES and the second judgment is NO, although the night view mode was set, the night view mode was not intentionally set by the user. Therefore, the mode judgment means 17 displays a warning message on the display means 18 together with an image represented by the image data S1.

Figure 11:
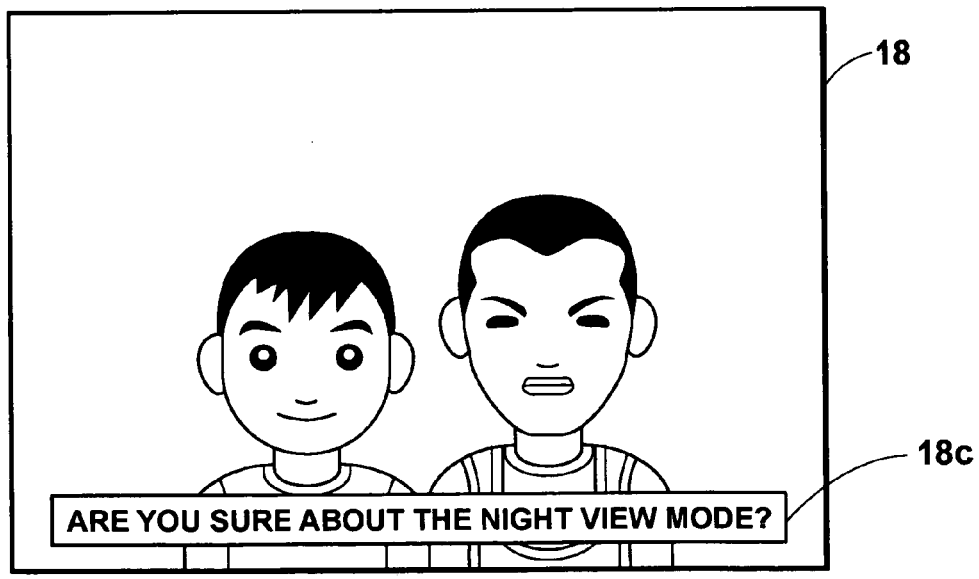
FIG. 11 illustrates the content of display by a display means in the fifth embodiment.

FIG. 11 illustrates the content of display on the display means 18 in the case that the first judgment is YES and the second judgment is NO. As illustrated in FIG. 11, a warning message 18c saying "ARE YOU SURE ABOUT THE NIGHT VIEW MODE?" is displayed on the display means 18 together with the image represented by the image data S1.

As described above, in the fifth embodiment, if the first judgment is YES and the second judgment is NO, the warning message 18c is displayed on the display means 18. Therefore, when a user of the digital camera 1 sees the warning message 18c, the user can realize that he/she erroneously set the night view mode at the time of photography by using the digital camera 1. Therefore, the user can retake a photograph, if needed, by setting a correct photography mode.

In the above-described fifth embodiment, when the image data S1 recorded in the memory card 14 is displayed on the display means 18, the first judgment and the second judgment are made. However, in some cases, a so-called preview mode has been set at the digital camera 1. The preview mode is a mode for displaying the image data S1 obtained by photography on the display means 18 immediately after photography. There are also cases, where a mode for displaying the image data S1 obtained by photography on the display means 18, making a user check the image data S1 and recording the image data S1 in the memory card 14 only when an instruction to record is given by the user has been set at the digital camera 1. In these cases, the first judgment and the second judgment may be made immediately after photography. If the first judgment and the second judgment are NO, the warning message 18c may be displayed on the display means 18. Accordingly, the user can immediately retake a photograph, if needed, by setting a correct photography mode.

Further, when a photograph is taken with the digital camera 1, if a shutter button is pressed halfway down, an automatic focus function starts working. When a photograph is taken by using the automatic focus function, image data may be temporarily obtained, and the first judgment and the second judgment may be made on the image data. If the first judgment and the second judgment are NO, the warning message 18c may be displayed on the display means 18. Accordingly, the user can correctly set the photography mode before photography.

In the above-described fifth embodiment, the judgment may be further made on whether the user has intentionally set the portrait mode, in the same manner with the above-described second embodiment, by judging whether the ratio of the facial region included in the image S1 is equal to or larger than $1/10$ of the entire area of the image S1 when the portrait mode has been set.

In the above-described fifth embodiment, otherinformation such as photography time and a file name of the image data S1 maybe displayed together with the warning message 18c.

Further, in the above-described fifth embodiment, the user may set whether the first judgment and the second judgment should be made.

What is claimed is:

1. An image processing apparatus comprising:
 a read-out means for reading out image data on which image processing has been performed and to which supplementary information including image processing information regarding the image processing has been attached;
 an intention judgment means for judging whether the image processing has been intentionally performed, based on the image processing information and information other than the image processing information, included in the supplementary information;
 a processing means for obtaining processed image data by performing at least one kind of further image processing on the image data; and
 a control means for controlling the processing means so that the processing means performs the further image processing on the image data by canceling or reducing a processing amount of the image processing which has already been performed on the image data in the further image processing if the judgment by the intention judgment means is YES, or so that the processing means performs the further image processing on the image data, including the image processing which has already been performed if the judgment by the intention judgment means is NO.

2. An image processing apparatus as defined in claim 1, further comprising:
 a display means for displaying the judgment result by the intention judgment means.

3. An image processing apparatus as defined in claim 1, further comprising:
 a display means for displaying the judgment result by the intention judgment means; and
 an input means for receiving an instruction to continue processing, input by an operator based on the judgment result, wherein the control means controls the processing means so that the processing means performs the further image processing on the image data based on the judgment result only if the instruction to continue processing has been input from the input means.

4. An image processing apparatus as defined in claim 1, further comprising:
 a print-out means for printing out the processed image data and attaching information indicating a judgment result by the intention judgment means and/or the content of the further image processing which has been performed to a print of the processed image data.

5. An image processing apparatus as defined in claim 1, wherein the image processing information regarding the image processing is information indicating the content of the image processing performed on the image data.

6. An image processing apparatus as defined in claim 5, wherein the information indicating the content of the image processing is information indicating at least one kind of image processing, wherein the image processing includes automatic white balance adjustment processing, white balance adjustment processing according to a light source type, gradation correction processing, density correction processing, color correction processing, sharpness processing, monochrome processing and sepia processing.

7. An image processing apparatus as defined in claim 1, wherein the image processing information regarding the image processing is information from which the content of image processing performed on the image data can be inferred.

8. An image processing apparatus as defined in claim 7, wherein the information from which the content of the image processing can be inferred is at least one kind of information on setting at a digital camera, wherein the setting includes a photography mode, an automatic bracket function, photography using an optical filter, soft-focus photography, interval photography, continuous shooting, multiple exposure, synthesis with a template and synthesis with a frame.

9. An image processing apparatus as defined in claim 1, wherein the image processing information is information indicating a night view mode which was set at a photography device with which the image data was obtained, and wherein the image processing which has already been performed is exposure correction processing.

10. An image processing apparatus as defined in claim 1, further comprising:
a characteristic judgment means for judging whether an image represented by the image data has a characteristic which should appear in the image according to the image processing information included in the supplementary information attached to the image data when a plurality of kinds of image processing has been performed on the image data, wherein the control means controls the processing means so that the processing means performs the further image processing on the image data by canceling or reducing a processing amount of the image processing which has already been performed on the image data in the further image processing if the judgment by the characteristic judgment means is YES, or so that the processing means performs the further image processing on the image data, including the image processing which has already been performed on the image data if the judgment by the characteristic judgment means is NO.

11. An image processing apparatus as defined in claim 10, wherein the characteristic which should appear in the image according to the image processing information is at least one of color, gradation, density, sharpness, a kind of a specific subject included in the image, and a ratio of the specific subject to an entire image.

12. An image processing apparatus as defined in claim 10, wherein the image processing information is information indicating a portrait mode which was set at a photography device with which the image data was obtained, and wherein the image processing which has already been performed is gradation correction processing.

13. An image processing apparatus as defined in claim 1, wherein if photography mode information included in the supplementary information attached to the image data is not similar to a set photography mode, regular image processing and exposure correction processing is performed.

14. An image processing apparatus as defined in claim 13, wherein if the photography mode information in the supplementary information is similar to the set photography mode, exposure correction processing is not performed.

15. An image processing apparatus as defined in claim 14, wherein the photography mode information included in the supplementary information comprises photography date and/or time information.

16. An image processing method comprising the steps of:
reading out image data on which image processing has been performed and to which supplementary information including image processing information regarding the image processing has been attached;
judging whether the image processing has been intentionally performed, based on the image processing information and information other than the image processing information, included in the supplementary information;
obtaining processed image data by performing at least one kind of further image processing on the image data; and
performing the further image processing on the image data by canceling or reducing a processing amount of the image processing which has already been performed on the image data in the further image processing if a result of the judging is YES, or so that the further image processing is performed on the image data, including the image processing which has already been performed if a result of the judging is NO.

17. A computer readable recording medium having embodied thereon a computer program for executing an image processing method, the method comprising:
reading out image data on which image processing has been performed and to which supplementary information including image processing information regarding the image processing has been attached;
judging whether the image processing has been intentionally performed, based on the image processing information and information other than the image processing information, included in the supplementary information;
obtaining processed image data by performing at least one kind of further image processing on the image data; and
performing the further image processing on the image data by canceling or reducing a processing amount of the image processing which has already been performed on the image data in the further image processing if a result of the judging is YES, or so that the further image processing is performed on the image data, including the image processing which has already been performed if a result of the judging is NO.

18. An image processing method comprising the steps of:
obtaining processed image data by performing at least one kind of further image processing on image data on which image processing has been performed and to which supplementary information including image processing information regarding the image processing has been attached;
judging whether the image processing has been intentionally performed, based on the image processing information and information other than the image processing information, included in the supplementary information; and
performing the further image processing on the image data by canceling or reducing a processing amount of the image processing which has already been performed on the image data in the further image processing if the judgment is YES, or performing the further image processing on the image data, including the image processing which has already been performed if the judgment is NO.

19. A computer readable recording medium having embodied thereon a computer program for executing an image processing method, the method comprising:
obtaining processed image data by performing at least one kind of further image processing on image data on which image processing has been performed and to which supplementary information including image processing information regarding the image processing has been attached;
judging whether the image processing has been intentionally performed, based on the image processing information and information other than the image processing information, included in the supplementary information; and
performing the further image processing on the image data by canceling or reducing a processing amount of the image processing which has already been performed on the image data in the further image processing if the judgment is YES or performing the further image processing on the image data, including the image processing which has already been performed if the judgment is NO.

* * * * *